No. 651,025. Patented June 5, 1900.
S. E. WARRICK.
BAND CUTTER AND FEEDER FOR THRESHING MACHINES.
(Application filed Feb. 9, 1900.)
(No Model.) 2 Sheets—Sheet 2.
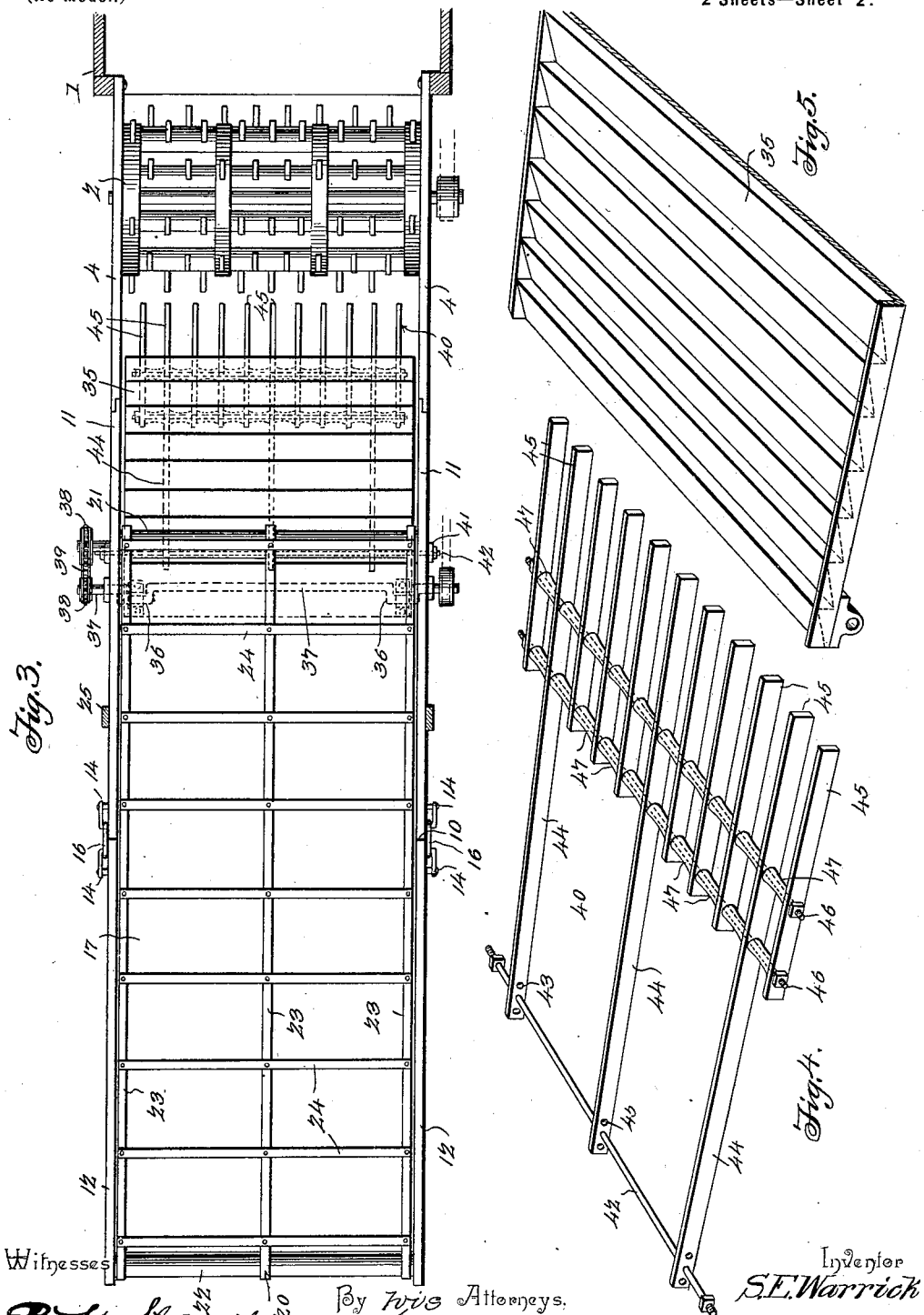

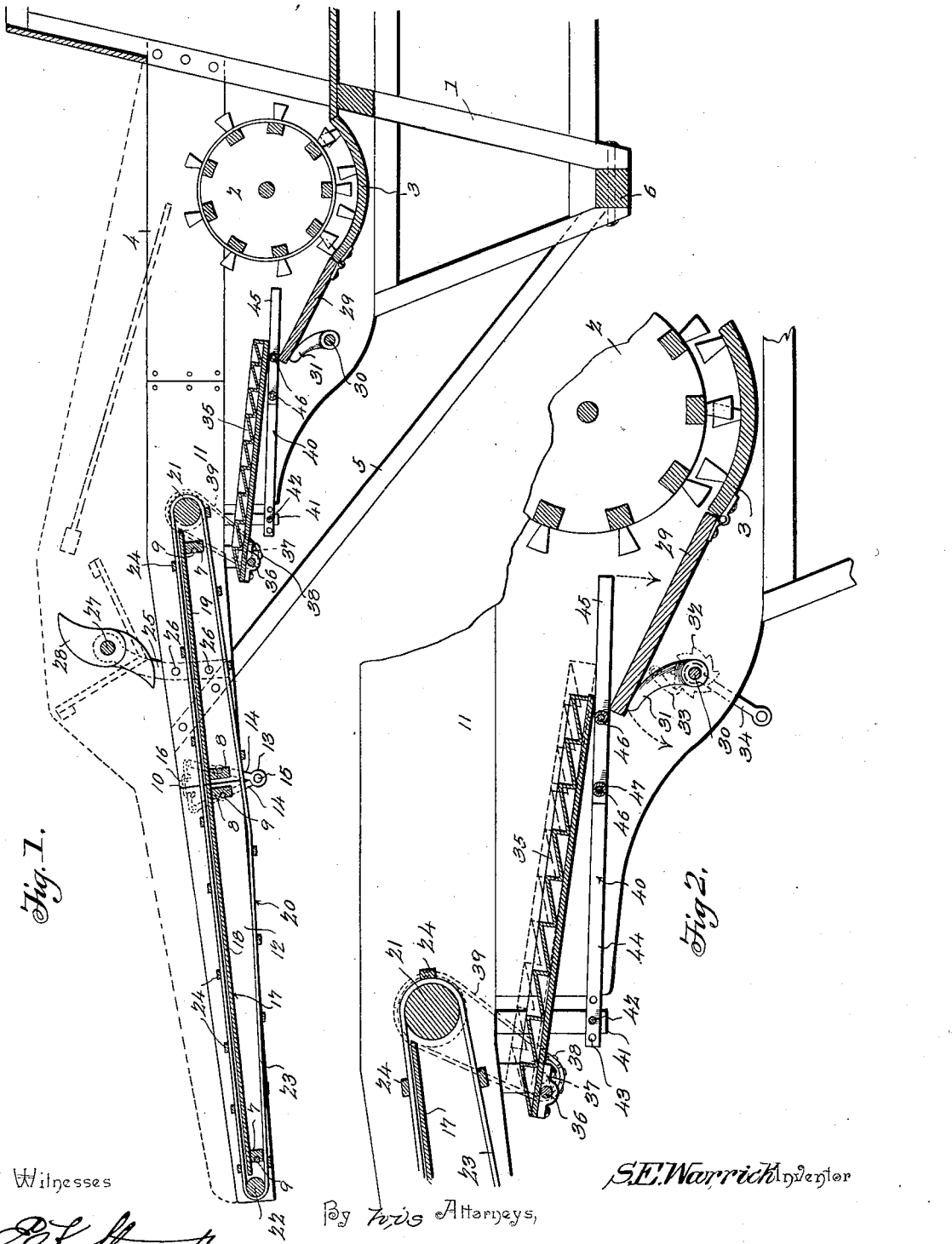

UNITED STATES PATENT OFFICE.

SILAS E. WARRICK, OF PIPESTONE, MINNESOTA.

BAND-CUTTER AND FEEDER FOR THRESHING-MACHINES.

SPECIFICATION forming part of Letters Patent No. 651,025, dated June 5, 1900.

Application filed February 9, 1900. Serial No. 4,660. (No model.)

*To all whom it may concern:*

Be it known that I, SILAS E. WARRICK, a citizen of the United States, residing at Pipestone, in the county of Pipestone and State of Minnesota, have invented a new and useful Band-Cutter and Feeder for Threshing-Machines, of which the following is a specification.

My invention is an improvement in band-cutters and feeders for threshing-machines, one object of my invention being to provide means for preventing the bundles of grain from choking the threshing mechanism.

A further object of my invention is to provide means for regulating the feed while the threshing-machine is in operation, thus avoiding the necessity of varying the area of the concave by adding or removing concave-sections, as is now required.

A further object of my invention is to provide a novel form of endless feeder which is adapted to be folded when the machine is not in operation.

With these and other objects my invention consists in the combination, with a feeder, a grain-pan, and a threshing mechanism, of a relatively-stationary guard interposed between the grain-pan and the threshing mechanism to prevent bundles of grain from choking the space between the threshing-cylinder and concave.

My invention further consists in the combination, with a feeder, a reciprocatory grain-pan, and a threshing mechanism, of an adjustable relatively-stationary guard interposed between the reciprocatory grain-pan and the threshing mechanism, and means for adjusting said guard and said grain-pan to regulate the feed.

My invention further consists in the peculiar construction and combination of devices hereinafter fully set forth, and pointed out in the claims.

In the accompanying drawings, Figure 1 is a vertical longitudinal central sectional view of a band-cutter and feeder for threshing-machines embodying my improvements, showing the same attached to a threshing-machine. Fig. 2 is a similar view, on a somewhat-larger scale, of a portion of the feeder, the grain-pan, the adjustable guard, the hinged concave-board, and the threshing mechanism. Fig. 3 is a top plan view of the mechanism shown in Fig. 1. Fig. 4 is a detail perspective view of the adjustable guard. Fig. 5 is a similar view of the grain-pan.

The framing 1 of the threshing and separating machine is of the usual or any preferred construction. 2 is the threshing-cylinder, and 3 is the concave, located under the same, said cylinder and said concave being also of the usual construction. Projecting from the front end of the threshing and separating machine are a pair of boards 4, of suitable length and preferably of the form here shown in Fig. 1, although this may be varied. The said boards are secured at their inner ends to the sides of the framing of the threshing and separating machine and are supported by braces 5, the lower ends of which braces are secured to the bolster 6 of the framing, as shown; but, if preferred, said boards 4 may be secured and supported in any other suitable manner. The outer portions of the boards 4 are connected together by a series of cross-bars 7 8, the latter being located at a suitable distance from the outer ends of said boards 4 and within a few inches of each other. Tie-rods 9 extend transversely through the boards 4 and lie in grooves in the sides of the bars 7 and 8, as shown, said tie-rods being provided at their outer ends with retaining-nuts and serving to clamp the boards 4 firmly on the ends of the cross-bars 7 8. The boards 4 are divided, as at 10, and comprise the inner sections 11 and the outer sections 12, the meeting ends of said sections being midway between the cross-bars 8. Hinges 13 serve to connect the sections 11 12 together and permit the outer section 12 to be folded inward under the front end of the separating and threshing machine. Each of the said hinges comprises the bars or members 14, which are engaged by the outer portions of the tie-rods 9 in the cross-bars 8, said tie-rods 9 serving also to secure said hinged members or bars to the outer sides of the boards 4. The pivots 15 of the hinges are at a suitable distance below the boards 4, and the upper ends of the members of the hinges are provided with engaging hooks 16 or other suitable devices for securing the sections of the boards 4 together when said sections are extended in line with each other, as shown in Fig. 1. A sheet-steel bottom 17 connects the boards 4 together, said sheet-steel bottom comprising the sections 18 19, corresponding with the sections of the boards 4. An endless feeder 20 is disposed between the boards 4 and comprises the inner roller-shaft 21, journaled in the sections 11 of said boards, the roller-shaft 22, journaled in the sections 12 of said boards at the outer ends thereof, and the endless carrier-belts 23, which connect and are operated by said roller-shafts, said endless carrier-belts being connected together by the usual transverse slats 24. The upper lead of said endless feeder travels over the sheet-steel bottom 17, as shown in Figs. 1 and 2.

Bracket-arms 25 project from the upper sides of the boards 4 at a suitable distance from the roller-shaft 21, said bracket-arms being bolted to the outer side of said boards, as indicated at 26 in Fig. 1, and the upper ends of said bracket-arms form bearings 27 for the revoluble cutter-shaft 27$^a$, which is provided with a series of radially-disposed revoluble band-cutting knives 28, either of the form here shown or of any other suitable form, said series of knives extending across the endless feeder and being disposed at a suitable height above the upper lead thereof.

To the outer side of the concave or concave-frame is hinged a bridge or feed board 29, the outer edge of which is supported by any suitable means, whereby the same may be raised and lowered for a purpose presently described. For the purposes of illustration I have shown in the accompanying drawings a rock-shaft 30, which is journaled in the sides of the separating and threshing machine and is disposed under the bridge or feed board 29, said rock-shaft being provide with cam-arms 31, which engage the lower side of said feed or bridge board and are adapted to raise and lower the free side of the same when the rock-shaft is partly turned, so as to adjust said feed or bridge board to any required angle, as will be understood. I have also shown a ratchet-wheel 32 attached to the said shaft, a pivoted pawl 33 for engaging the said ratchet-wheel, and thereby locking said rock-shaft at any required adjustment, and a crank-arm 34 for adjusting said shaft in order to vary the inclination of the bridge or feed board 29; but I do not limit myself to any peculiar device for accomplishing such adjustment.

A grain-pan 35 is adapted to receive the grain from the feeder and to convey the same to the threshing mechanism. The said grain-pan has its outer end supported on the crank portion 36 of a shaft 37, the latter being indicated in the drawings, Figs. 1 and 2, as being connected to and rotated by the roller-shaft 21, said roller-shaft and said crank-shaft being connected together by suitable pulleys 38 and a suitable endless belt 39; but any other suitable means may be employed for rotating said crank-shaft. It will be understood that by reason of the grain-pan being secured at one end to the crank portion of the shaft 36 said grain-pan will be given a rotatory reciprocatory motion by said crank-shaft, the outer end of the grain-pan being rotated by the crank-shaft and the inner free supported end of said grain-pan being free to reciprocate. Said grain-pan extends to within a suitable distance of the threshing-cylinder, and the lower free supported end thereof is adapted to discharge onto the threshing mechanism.

Heretofore in machinery of this class a serious difficulty has been that such grain-bundles as escape being unbound by the band-cutting mechanism are fed bodily into the threshing mechanism, tending thereby to choke the same and subjecting the threshing mechanism to greatly-increased stress, frequently resulting in the breaking of the concave threshing-cylinder or the breaking or bending of the teeth thereof, besides greatly increasing the load on the engine employed for actuating the threshing mechanism, and hence either lowering the speed thereof or stopping the same altogether or causing the power-applying belts to slip on their pulleys. One object of my invention is to obviate this difficulty, and this I accomplish by providing a relatively-stationary guard 40, which is interposed between the discharge end of the grain-pan and the threshing mechanism. The outer end or side of the guard 40 is pivoted between a pair of suitable hangers 41 and on a rod 42, which connects said hangers, the guard being provided with a series of adjusting-openings for said rod, by means of which the breadth of the portion of said guard between the grain-pan and the threshing-cylinder may be varied. Said guard rests upon and is supported by the free outer side of the adjustable feed or bridge board 29 and in turn serves to support and guide the lower inner free reciprocating end of the grain-pan, as shown in Figs. 1 and 2, and it will be understood that the free ends of said guard and said grain-pan participate in the adjustments of said bridge or feed board 29. The said guard 40 comprises a series of bars 44 45 of unequal length connected together near their outer ends by tie-bolts 46 and sleeve-blocks 47 on said tie-bolts interposed between the proximate side of said bars 44 45 and serving to space the latter at suitable regular distances apart. The outer ends of the bars 44 45 constitute fingers which are interposed between the grain-pan and the threshing mechanism, the distance between the inner ends of said fingers and the proximate side of the threshing-cylinder being varied by adjusting said guard on the rod 41 and being further varied by means of the rock-shaft and rock-arms when the angles of inclination of the feed or bridge board 29 and the grain-pan and guard are changed.

The operation of my invention is as follows: The grain-bundles are fed in the usual manner by the endless feeder to the band-cutting knives and the unbound grain discharged from the feeder onto the reciprocating grain-pan, which, as here shown, is adapted for feeding the straw and grain to the threshing mechanism, the straw and grain being discharged from the grain-pan onto the projecting fingers of the relatively-stationary guard 40 and caused to be fed over said fingers to the threshing-cylinder by the reciprocating proximate end of the grain-pan. In the event that a bundle of grain should pass under the series of band-cutting knives without being unbound, which frequently occurs in machinery of this class, said bundle or sheaf of grain will be discharged from the feeder onto the grain-pan and from the latter to the projecting fingers of the guard, and the said fingers of the said guard will support and retain the said bundle or sheaf and prevent the same from passing bodily between the cylinder and concave, the toothed cylinder speedily tearing the bundle or sheaf into pieces and unbinding the same and the guard serving to support the said sheaf or bundle until it has been so treated by the threshing-cylinder, and hence the bundle or sheaf is effectually prevented from being fed bodily to the threshing mechanism.

By varying the inclination of the feed or bridge board 29, the guard 40, and grain-pan 35 in the manner hereinbefore described the feed of the grain to the threshing mechanism may be regulated to suit the conditions of the grain.

Heretofore in machinery of this class when the grain was damp or wet it tended to cling together after being unbound and was fed to the threshing mechanism frequently in more or less compact masses of varying sizes, thus rendering it necessary to increase the efficiency of the threshing mechanism in order to successfully and thoroughly disintegrate such damp or wet masses of the grain and effect a thorough separation of the grain from the straw, and this has been accomplished by adding sections to the concave, so as to increase the coacting area of the concave, an operation which requires that the machinery be first stopped, requires the services of at least two men, and consumes considerable valuable time. By my improved feeding mechanism I obviate this difficulty. When the grain is damp or wet, the free ends of the grain-pan, guard, and bridge or feed board should be raised, thereby causing the grain to pass more slowly over the grain-pan by lessening the inclination of the latter, and hence subjecting the grain more thoroughly to the disintegrating action of the reciprocating grain-pan, the fingers of the guard also serving to support the wet grain as it is discharged from the grain-pan and permitting said wet grain to be fed to the threshing mechanism only as rapidly as the grain passes over the grain-pan. Such adjustment can be readily accomplished by merely partly rotating the rock-shaft 30 and without the necessity of stopping the machinery, and while the threshing is in progress the inclination of the grain-pan, guard, and feed-board may be varied with the conditions of the grain as to wetness and dryness thereof.

Having thus described my invention, I claim—

1. The combination with a threshing mechanism, of a grain-pan, a revoluble crank-shaft supporting one end of said grain-pan and to impart reciprocatory motion thereto, a guard pivoted at one end, and at the free end having projecting fingers extending toward the threshing mechanism, the free end of the reciprocatory pan being supported by and movable on said guard, the fingers of the latter projecting beyond the said free end of said grain-pan, the inclined hinged feed-board, serving to support said guard, and means to vary the inclination of said feed-board and thereby vary the distance between the ends thereof and the proximate side of the threshing-cylinder, for the purpose set forth, substantially as described.

2. The combination with a threshing mechanism, of a feed or bridge board, means for varying the inclination of the latter, a pivoted, relatively-fixed and longitudinally-adjustable guard having its free end supported on said feed-board and thereby adjustable vertically when the inclination of the latter is varied, and a reciprocatory grain-pan having one end supported and movable on said guard, the latter having fingers projecting between said grain-pan and the threshing mechanism, substantially as described.

3. The combination of a threshing mechanism, a reciprocatory grain-pan, means to vary the inclination of the latter, a pivoted and longitudinally-adjustable guard having projecting fingers extending beyond the grain-pan toward the threshing mechanism, and means to vertically adjust said fingers and thereby vary the distance between the ends thereof and the proximate side of the threshing-cylinder, substantially as described.

In testimony that I claim the foregoing as my own I have hereto affixed my signature in the presence of two witnesses.

SILAS E. WARRICK.

Witnesses:
D. W. EVANS,
REBA MACKAY.